(12) United States Patent
Domine

(10) Patent No.: US 7,479,327 B2
(45) Date of Patent: *Jan. 20, 2009

(54) TIE-LAYER MATERIALS FOR USE WITH IONOMER-BASED FILMS AND SHEETS AS SKINS ON OTHER MATERIALS

(75) Inventor: Joseph Dominic Domine, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/826,979

(22) Filed: Apr. 16, 2004

(65) Prior Publication Data

US 2004/0241474 A1 Dec. 2, 2004

Related U.S. Application Data

(60) Provisional application No. 60/473,783, filed on May 27, 2003.

(51) Int. Cl.
B32B 27/32 (2006.01)

(52) U.S. Cl. .................... 428/523; 428/500

(58) Field of Classification Search .............. 428/411.1, 428/520, 522, 516, 500, 523; 264/173.11, 264/173.14, 173.15; 528/49, 422
See application file for complete search history.

(56) References Cited

U.S. PATENT DOCUMENTS

| | | | |
|---|---|---|---|
| 2,714,605 A | 8/1955 | Jones | |
| 2,764,563 A | 9/1956 | McMaster et al. | |
| 3,072,618 A | 1/1963 | Turbak | |
| 3,094,144 A | 6/1963 | Oxley et al. | |
| 3,097,194 A | 7/1963 | Leonard et al. | |
| 3,205,285 A | 9/1965 | Turbak et al. | |
| 3,255,130 A | 6/1966 | Keim et al. | |
| 3,264,272 A | 8/1966 | Rees | 260/78.5 |
| 3,322,734 A | 5/1967 | Rees et al. | |
| 3,338,734 A | 8/1967 | Goff et al. | |
| 3,355,319 A | 11/1967 | Rees et al. | |
| 3,522,222 A | 7/1970 | Taylor | |
| 3,522,223 A | 7/1970 | Taylor | |
| 4,148,972 A | 4/1979 | Yamane et al. | 428/515 |
| 4,307,211 A | 12/1981 | Ito et al. | |
| 4,335,175 A | 6/1982 | Webb | 428/213 |
| 4,569,865 A | 2/1986 | Placek | |
| 4,654,255 A * | 3/1987 | Kojima et al. | 442/149 |
| 4,656,098 A | 4/1987 | Yonekura et al. | 428/517 |
| 4,800,130 A | 1/1989 | Yonekura et al. | 428/517 |
| 4,801,649 A | 1/1989 | Statz | |
| 4,911,451 A | 3/1990 | Sullivan et al. | |
| 4,948,822 A * | 8/1990 | Iovine et al. | 523/201 |
| 5,089,332 A | 2/1992 | Feinberg | |
| 5,120,484 A | 6/1992 | Cloeren | |
| 5,206,294 A | 4/1993 | Dawson | 525/196 |
| 5,210,138 A | 5/1993 | Yamamoto et al. | |
| 5,281,651 A | 1/1994 | Arjunan et al. | |
| 5,320,905 A | 6/1994 | Vaughn et al. | |
| 5,397,833 A | 3/1995 | Arjunan | |
| 5,482,766 A | 1/1996 | Mathavan et al. | 428/308.4 |
| 5,516,474 A | 5/1996 | Cloeren | |
| 5,543,233 A | 8/1996 | Latiolais et al. | 428/516 |
| 5,554,698 A | 9/1996 | Wang et al. | |
| 5,631,328 A | 5/1997 | Wang et al. | |
| 5,929,174 A | 7/1999 | Permentier et al. | |
| 5,973,046 A | 10/1999 | Chen et al. | |
| 2001/0003021 A1 | 6/2001 | Shepard et al. | 428/475.8 |
| 2002/0114951 A1 | 8/2002 | Horansky | 428/412 |
| 2002/0114965 A1 | 8/2002 | Horansky | 428/520 |

FOREIGN PATENT DOCUMENTS

| | | |
|---|---|---|
| DE | 36 26 809 | 12/1987 |
| EP | 0 287 839 | 10/1988 |
| EP | 0 342 897 | 11/1989 |
| EP | 0 721 856 | 7/1996 |
| EP | 1 279 493 | 1/2003 |
| GB | 1011981 | 1/1965 |
| JP | 08269409 | 10/1996 |
| JP | 2000085062 | 3/2000 |
| JP | 04052136 | 2/2004 |
| WO | WO 95/11929 | 5/1995 |
| WO | WO 96/23009 | 8/1996 |
| WO | WO 97/02317 | 1/1997 |

(Continued)

OTHER PUBLICATIONS

Copending U.S. Appl. No. 10/469,072 and Copending U.S. Appl. No. 10/472,871.*

(Continued)

*Primary Examiner*—Thao T. Tran
(74) *Attorney, Agent, or Firm*—Leandro Arechederra; David M. Weisberg; Kevin M. Faulkner

(57) ABSTRACT

The present invention relates to new tie-layer materials for making (1) new multilayer structures formed from one or more ionomers and one or more new tie-layers including a (co) extrudable tie resin (CTR), and optionally a backing layer to form laminates, (2) new composite articles made from these laminates in combination with optional substrate materials, and (3) new methods of making composite articles from these laminates by shaping and subsequently contacting them with a substrate material.

20 Claims, No Drawings

FOREIGN PATENT DOCUMENTS

| WO | WO 97/11995 | 4/1997 |
|---|---|---|
| WO | WO 98/52981 | 11/1998 |
| WO | WO 01/78981 | 10/2001 |
| WO | WO 02/066249 | 8/2002 |
| WO | WO 02/067853 | 9/2002 |
| WO | WO 02/078953 | 10/2002 |
| WO | WO 02/078954 | 10/2002 |
| WO | WO 2004/106058 | 12/2004 |

OTHER PUBLICATIONS

Abstract for DE 36 26 809, Dietmar, Dec. 10, 1987, entitled "Biaxially Oriented Polypropylene Film—Includes Gas Barrier and Sealing Layers, for Packaging Foodstuffs".

Abstract for EP 0 721 856, Olivier, Jul. 17, 1996, entitled "Sealing Profile and method for Making the Same".

Kroschwitz, Jacqueline I.; *"Blow Molding,"* Concise Encyclopedia of Polymer Science and Engineering, pp. 90-92, 1990.

Lewis, Richard J. Sr.; *"Hawley's Condensed Chemical Dictionary,"* Van Nostrand Reinhold, pp. 852, 1997.

Lantman, C.W. et al.; *"Ionomers,"* Comprehensive Polymer Science, Pergamon Press, vol. 2, pp. 755-772, 1989.

Whelan, Tony; *"Polymer Technology Dictionary,"* pp. 443, 1994.

Wunderlich B. et al.; *"Thermoforming,"* Encyclopedia of Polymer Science nad Engineering, John Wiley & Sons, vol. 16, pp. 807-832, 1989.

Harper C.; *"Summary of Thermoplastics,"* Handbook of Plastics, Elastomers & Composite Articles, McGraw-Hill, Inc., Chapter 3, pp. 3.18-3.25, 1992.

\* cited by examiner

TIE-LAYER MATERIALS FOR USE WITH IONOMER-BASED FILMS AND SHEETS AS SKINS ON OTHER MATERIALS

CROSS REFERENCE TO RELATED APPLICATIONS

This application claims the benefit of Provisional Application No. 60/473,783 filed May 27, 2003, the disclosure of which is incorporated by reference.

FIELD OF THE INVENTION

The present invention relates to new tie-layer materials for making (1) new multilayer structures formed from one or more ionomers and one or more new tie-layers including a (co)extrudable tie resin (CTR), and optionally a backing layer to form laminates, (2) new composite articles made from these laminates in combination with optional substrate materials, and (3) new methods of making composite articles from these laminates by shaping and subsequently contacting them with a substrate material.

BACKGROUND OF THE INVENTION

Durable, glossy fascia associated with articles such as automobiles, luggage, appliances, and other durable articles made from plastics increase both the aesthetic appeal and the utility of these articles. These article attributes are provided, in part, through the incorporation of ionomer materials.

Ionomer materials are known in the art, and are useful in laminates to coat various substrates to form composite articles. See, for example, U.S. Pat. Nos. 3,264,272, 5,482,766, 4,148,972, 5,543,233, 4,800,130, 4,656,098, 5,206,294, 4,335,175, U.S. patent application Publication Nos. 2001/003021, 2002/0114951, 2002/0114965, DE 36 26 809 A, EP 0 721 856, EP 0 342 897, EP 1 279 493, EP 0 287 839, JP 08269409, JP 2000085062, JP 04052136, WO 01/78981, WO 02/078953, and WO 02/078954. Ionomer laminates are useful for their scratch and abrasion resistance, as well as toughness and aesthetic appeal. However, with a growing demand for new applications for ionomer laminates and composite articles produced from ionomer laminates, there continues to be a need for new materials to produce new laminates for the wide array of applications.

The invention fulfills this need by providing for new tie-layer materials that may be used in new ionomer laminates and new composite articles produced from those ionomer laminates

SUMMARY OF THE INVENTION

In an embodiment, the invention relates to a laminate comprising an ionomer layer and a tie-layer comprising a (co)extrudable tie resin (CTR).

In another embodiment, the invention relates to a composite comprising an ionomer layer, a tie-layer comprising a CTR, and a substrate, optionally including a backing layer.

In one embodiment, the invention relates to a laminate comprising an ionomer layer, a tie-layer comprising a CTR, and a backing layer; wherein the tie-layer is disposed between the ionomer layer and the backing layer.

In another embodiment, the invention relates to a composite comprising an ionomer layer, a tie-layer comprising a CTR, and a substrate; wherein the tie-layer is disposed between the ionomer layer and the substrate.

In another embodiment, the invention relates to a composite comprising a tie-layer having a first side and a second side, wherein the first side is contacted to an ionomer layer, and the second side is secured to a substrate comprising at least one thermoplastic; and wherein the tie-layer comprises a CTR.

In yet another embodiment, the invention relates to a composite article comprising:
a) an ionomer layer;
b) a tie-layer;
c) a backing layer; and
d) a substrate;
wherein the ionomer layer and tie-layer contact one another and wherein the tie-layer comprises a CTR.

Additionally, the invention also provides for a method of forming a composite article comprising:
(a) providing a laminate;
(b) forming the laminate into a shape, the laminate comprising an ionomer layer contacted to a tie-layer comprising a CTR; and
(c) securing a substrate to the tie-layer of the laminate to form the composite article.

In another embodiment, the invention provides for a method of forming a composite article comprising:
(a) coextruding at least two materials to form a laminate;
(b) thermoforming the laminate into a shape, the laminate comprising an ionomer layer contacted to a tie-layer comprising a CTR; and
(c) injection molding a substrate layer against the tie-layer of the laminate to form the composite article.

The invention also provides for a composite article formed by the method comprising:
(a) forming a laminate comprising an ionomer layer and a tie-layer comprising a CTR;
(b) coextruding the ionomer layer and the tie-layer with a backing layer;
(c) forming a shape from the laminate, resulting in a shaped laminate; and
(d) securing a substrate material to the shaped laminate such that the substrate material is secured to the backing layer.

In any of the previous embodiments, a CTR may be selected from the group consisting of an amine containing polymer, an epoxy containing polymer, a polar copolymer, a polymer made from carbon monoxide, a polymer made from a diacid, a polymer made from an anhydride, and a polyolefin grafted with acrylic acid.

In any of the previous embodiments, the ionomer layer may include a first ionomer layer and a second ionomer layer.

In the previous embodiments, the first ionomer layer or the second ionomer layer may be pigmented, natural, or clear.

Additionally, in any of the previous embodiments, the invention provides for an optional backing layer.

DETAILED DESCRIPTION OF THE INVENTION

As used herein, the term "layer" refers to each of the one or more materials, the same or different, in an essentially planar form, that are secured to one another by any appropriate means such as by an inherent tendency of the materials to adhere to one another, or by inducing the materials to adhere as by a heating, radiative, chemical, or some other appropriate process to form laminates.

As used herein, the term "laminate" refers to any number of the same or different materials in layer form, each layer being secured to one another by any appropriate means such as by an inherent tendency of the materials to adhere to one another in a coextrusion process, or by inducing the materials to adhere as by a heating, radiative, chemical, or some other appropriate process. Some non-limiting process examples of forming laminates are coextrusion, thermal lamination, or adhesive bonding, or some combination thereof. Suitable adhesives include acrylic adhesives (both solvent and water-based), flexible epoxy adhesives, and hot melt adhesives. In an embodiment, the adhesive is not based on polyurethane (a non-polyurethane adhesive). The laminate may include an optional backing layer.

As used herein, the term "shaped laminate" refers to a laminate in either a planar or three dimensional form that is suitable for production of a finished article.

As used herein, the term "tie-layer" refers to a layer bonded to the ionomer layer(s). In most embodiments that include a backing layer, the backing layer is bonded to the ionomer layer(s) with the tie-layer. In embodiments that include a substrate, the substrate is bonded to the ionomer layer(s) with the tie-layer. Each tie-layer may comprise multiple layers.

As used herein "(co)extrudable tie resins" refers to polymers or modified polymers, as further defined below, suitable for making tie-layers by either extrusion or coextrusion. CTRs are thermoplastic materials that are solid at room temperature and soften or melt with increasing temperature, becoming formable.

As used herein, "(meth)acrylate" refers to either methacrylate or acrylate esters and "(meth)acrylic acid" refers to either methacrylic acid or acrylic acid.

As used herein, "polar copolymer" implies a copolymer of one or more $C_2$-$C_{10}$ α-olefins copolymerized with one or more polar monomers selected from the group consisting of ethylenically copolymerizable $C_3$-$C_{23}$ monoacid monomers; $C_4$-$C_{33}$ esters of ethylenically copolymerizable monoacid monomers; and $C_3$-$C_{23}$ vinyl esters.

As used herein, "hydrocarbon" refers to molecules or segments of molecules containing primarily hydrogen and carbon atoms. "Hydrocarbon" also includes halogenated versions and versions containing herteroatoms.

As used herein, "backing layer" refers to a tie-layer that forms the surface opposite from the ionomer surface of the multilayered laminate. In most embodiments, the backing layer requires a tie-layer of a different composition to bond it to the ionomer layer(s).

As used herein, "composite article" refers to an article formed from a multilayer laminate secured to a substrate.

As used herein, "substrate" refers to that part of the composite article that is behind the multilayered laminate, and typically provides the largest proportion of the mass of the composite article. It therefore governs the range of many of the physical properties of the composite article such as stiffness, tensile strength, impact strength, etc. Surface properties of the composite article, such as gloss, scratch resistance, abrasion resistance, color, appearance, "flop", are usually unaffected by the substrate.

As is well known in the art, the demarcation between "film" and "sheet" is nominally 250 μm. However, as used herein the term "sheet" can refer to single layered or multilayered structures with thicknesses that are greater than, equal to or less than 250 μm.

As used herein, the term "Groups" or "Group" refers to the new numbering scheme for the Periodic Table Groups as in HAWLEY'S CONDENSED CHEMICAL DICTIONARY 852 (13th ed. 1997).

In an embodiment, the composite article provides for a multilayered sheet secured to a substrate. The multilayered sheet provides for an ionomer layer (surface layer), pigmented or natural color, and a tie-layer, pigmented or natural color. The multilayered sheet is secured to a substrate.

In another embodiment, the composite article provides for a multilayered sheet including a backing layer. The multilayered sheet provides for an ionomer layer (surface layer), pigmented or natural color, a tie-layer, pigmented or natural color, and a backing layer.

In another embodiment, the composite article provides for a multilayered sheet secured to a substrate. The multilayered sheet provides for a set of ionomer layers comprising a surface layer of clear ionomer and a sub-surface layer of pigmented or clear ionomer, and a pigmented or natural color tie-layer. The multilayered sheet is secured to a substrate.

The composite article also provides for a multilayered sheet including a backing layer. The multilayered sheet provides for a set of ionomer layers comprising a surface layer of clear ionomer and a sub-surface layer of pigmented or clear ionomer, a pigmented or natural color tie-layer, and a pigmented or natural color backing layer.

In yet another embodiment, the composite article provides for a multilayered sheet including a backing layer secured to a substrate. The multilayered sheet provides for an ionomer layer (surface layer), pigmented or natural color, a tie-layer, pigmented or natural color, and a pigmented or natural color backing layer. The multilayered sheet is secured to a substrate.

In an embodiment, the composite article provides for a multilayered sheet including a backing layer secured to a substrate. The multilayered sheet provides for a set of ionomer layers comprising a surface layer of clear ionomer and a sub-surface layer of pigmented or clear ionomer, a pigmented or natural color tie-layer, and a pigmented or natural color backing layer. The multilayered sheet is secured to a substrate.

In the embodiments described above, all of the aforementioned layers, with the exception of the surface layer, may also be multiple layers, i.e, sets of ionomer layers, sets of tie-layers and/or sets of backing layers. These embodiments may also include sets of substrate layers.

In the embodiments described above, the tie-layer may comprise a blend of a maleated polypropylene and an acid polymer, more preferably an acid terpolymer.

In any of the structures described above, the tie-layer preferably comprises an epoxy containing polymer such as ethylene glycidyl methacrylate copolymers and terpolymers wherein the additional monomer is selected from the group consisting of methyl(meth)acrylate, ethyl(meth)acrylate, propyl(meth)acrylate, and butyl(meth)acrylate.

In any of the structures described above, the tie-layer preferably comprises ethylene(meth)acrylic acid copolymers alone or in blends with polyolefins and/or acid terpolymers.

In any of the structures described above, the tie-layer preferably comprises ethylene alkyl(meth)acrylate ester copolymers, more preferably wherein the alkyl(meth)acrylate monomer is selected from the group consisting of methyl (meth)acrylate, ethyl(meth)acrylate, propyl(meth)acrylate, butyl (meth)acrylate, and blends thereof. The ethylene alkyl (meth)acrylate ester copolymer may be used alone or in blends with polyolefins and/or acid copolymers or terpolymers.

Ionomer

Ionomers useful in the present invention are ionic compounds which are copolymers of $C_2$ to $C_4$ α-olefin derived units (ethylene is herein included as an "α-olefin"), and ethylenically copolymerizable acidic monomers including $C_3$ to $C_6$ α,β-ethylenically unsaturated carboxylic acids and monoesters of $C_4$ to $C_6$ unsaturated diacids, and which contain one or more kinds of metallic or organic cations associated with at least 5% of the acidic pendant groups of the polymer. Typical ionomers and methods of production are disclosed in, for example, U.S. Pat. Nos. 3,264,272, 4,911,451, 5,210,138, and 5,929,174; and WO 98/52981, 95/11929, 96/23009, 97/11995, and 97/02317, and described in COMPREHENSIVE POLYMER SCIENCE 755-772 (Colin Booth & Colin Price, ed. Pergamon Press 1989), in particular relating to ethylene-based materials.

The metal ion or ions suitable for forming the ionic copolymers of the present invention comprise mono, di or tri-valent metal ions in the Groups 1 through 13 of the Periodic Table of Elements. Embodiments include the following metal ions: $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$ $Sc^{3+}$, $Fe^{3+}$, $Al^{3+}$ and $Yt^{3+}$. In the various ions mentioned above, $Mg^{2+}$, $Na^+$ and $Zn^{2+}$ are metals used in desirable embodiments. Reaction of the carboxylic acid groups of the ionomer and a metal ion derived from a desirable metal compound (metal oxide, metal chloride, etc.) is referred to as "neutralization".

The ionomers useful in the present invention, either alone or as a blend of two or more ionomers, generally include more than 60 wt % α-olefin derived units in one embodiment by weight of the ionomer, and more than 70 wt % α-olefin derived units in another embodiment, and more than 80 wt % α-olefin derived units in one embodiment, and more than 85 wt % α-olefin derived units in yet another embodiment, and less than 95 wt % α-olefin derived units in another embodiment, and less than 85 wt % α-olefin derived units in another embodiment, and less than 75 wt % α-olefin derived units in yet another embodiment, and from 60 to 95 wt % α-olefin derived units in another embodiment, wherein a desirable range of α-olefin derived units that make up the ionomer is any combination of any upper limit with any lower limit described herein; and from 5 to 25 wt % of ethylenically copolymerizable acid monomers in one embodiment, and from 1 to 15 wt % of ethylenically copolymerizable acid monomers in another embodiment, and from 8 to 20 wt % of ethylenically copolymerizable acid monomers in another embodiment, wherein a desirable embodiment of a useful ionomer may comprise any upper wt % limit and any lower wt % limit of any ethylenically copolymerizable acid monomers described herein.

The polymer may be neutralized to form the ionomer to any degree between 10% to 100% based on the total amount of neutralizable carboxylate groups in one embodiment, and from 20% to 80% in another embodiment, and from 40% to 75% in yet another embodiment, and from 5% to 70% in yet another embodiment, provided the necessary scratch and mar resistance is maintained. A desirable level of neutralization may include any upper neutralization % limit and any lower neutralization % limit described herein.

One embodiment of an ionomer can be described as in the following structure (1):

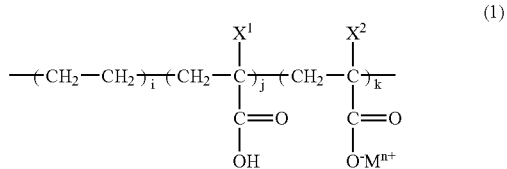

wherein $X^1$ and $X^2$ can be the same or different and are hydrogen or a $C_1$ to $C_6$ alkyl, and $M^{n+}$ is a metal ion or $NH_4^+$.

Of course, it is understood that when n is >1, such as with a divalent metal ion such as $Zn^{2+}$, that charge neutrality for the ionomer is achieved by reaction with a total of n acid groups from either the same polymer chain, or an adjacent polymer chain. The structure (1) is not intended to be construed that the ionomer is a block copolymer or limited to being a block copolymer. The values of i, j, and k are determined by the following relationships (2) and (3):

$$\frac{j+k}{i+j+k} = Q \qquad (2)$$

$$\frac{k}{j+k} = P \qquad (3)$$

wherein Q is from 10 to 40% of the polymer units derived from the acidic monomer(s) relative to the total weight of the ionomer in one embodiment, and from 15 to 20% of polymer units derived from the acidic monomer(s) in another embodiment, and P is from 10 to 80% of the acidic groups neutralized with the metallic ions in one embodiment, and from 20 to 70% of the acidic groups neutralized with the metallic ions in another embodiment, and from 20 to 60% in yet another embodiment, and further ranges as stated above. The polymer component i, derived from ethylene in one embodiment, can be linear or branched.

The ionomers or blends of two or more ionomers should be capable of being formed into a sheet having a thickness of from 15 μm to 6 mm, and from 25 μm to 700 μm in another embodiment, and possess desired properties, i.e., a high or low gloss, scratch resistance, abrasion resistance, etc. Useful ionomers or ionomer blends have a peak melt temperature of greater than 75° C. in one embodiment, and between 75° C. and 150° C. in another embodiment, and between 75° C. and 95° C. in one embodiment, and between 80° C. and 90° C. in another embodiment; and a melt index (MI) of between 0.1 dg/min and 30 dg/min (ASTM D1238, 190/2.16) in one embodiment, from 0.2 to 8 dg/min in one embodiment, from 0.5 to 5 dg/min in another embodiment, and from 0.8 to 2.5 dg/min in yet another embodiment, wherein a desirable range may be any combination of any upper MI limit with any lower MI limit described herein.

The ionomers useful in the present invention should provide high scratch and impact resistance to the laminate and composite article. The ionomers or ionomer blends have a 1% secant flexural modulus (ASTM D-790) of greater than 50 MPa in one embodiment, and greater than 100 MPa in another embodiment, and greater than 200 MPa in another embodiment, and greater than 400 MPa in yet another embodiment, between 50 and 400 MPa in one embodiment, and from 100 to 350 MPa in another embodiment. Desirable ionomers are ethylene methacrylic acid copolymer ionomers and ethylene acrylic acid copolymers ionomers and the like. Particularly desirable ionomers are those that are sodium, zinc or magnesium salts of acrylic acid or methacrylic acid copolymers.

Further, in a desirable embodiment, certain blends of ionomers based on ethylene acrylic acid copolymer neutralized with divalent and monovalent metal ions (cations) such as $Zn^{2+}$ and $Na^+$, display a synergistic MI "uplift" as disclosed in, for example, U.S. Pat. Nos. 5,210,138, and 5,929,174 are useful. In one embodiment of the invention, one or more of the ionomer layers that make up the laminate is a blend of a first ionomer having an MI value of from 0.6 to 1.0 dg/min, and a second ionomer having an MI value of from 2.1 to 3.0 dg/min. The blend of the first and second ionomers includes from 45 wt % to 95 wt % of the first ionomer in one embodiment, and from 55 wt % to 85 wt % of the first ionomer in another embodiment, and from 65 wt % to 80 wt % of the first ionomer in yet another embodiment, and from 72 wt % to 78 wt % of the first ionomer in yet another embodiment, and 75 wt % of the first ionomer in yet another embodiment, wherein a desirable range may include any upper wt % limit and any lower wt % limit described herein. The blends may include blends of two or more ionomers having different metallation (different metals and/or different % of metallation), different MI values, or a combination of variables.

Other examples of ionomers useful in the present invention include, but are not limited to, butadiene-acrylic acid copolymer ionomers, perfluorsulfonate ionomers, perfluorocarboxylate ionomers, telechelic polybutadiene ionomers, sulfonated ethylene-propylene-diene terpolymer ionomers, styrene-acrylic acid copolymer ionomers, sulfonated polystyrene ionomers, sulfonated polypentenamer ionomers, telechelic polyisobutylene sulfonated ionomers, alkyl methacrylate-sulfonate copolymer ionomers, styrene-based polyampholytes ionomers and acid-amine ionomers and the like. Typical examples of ionomers employing salts of carboxylic acid type pendent groups are disclosed in GB 1,011,981; U.S. Pat. Nos. 3,264,272; 3,322,734; 3,338,734; 3,355,319; 3,522,222; and 3,522,223. Typical examples of ionomers employing phosphonate-type pendent groups include those disclosed in U.S. Pat. Nos. 3,094,144; 2,764,563, 3,097,194; and 3,255,130. Typical examples of ionomers employing sulfonate-type pendent groups include those disclosed in U.S. Pat. Nos. 2,714,605; 3,072,618; and 3,205,285. Other useful ionomers are disclosed generally in U.S. Pat. Nos. 5,631,328, 5,631,328, 5,554,698, 4,801,649, 5,320,905, 5,973,046, and 4,569,865.

Ionomers comprising copolymers of ethylene derived units and acrylic acid (AA) derived units are desirable. Examples of commercially available ionomers include, but are not limited to, IOTEK ionomers (ExxonMobil Chemical Company, Houston, Tex.), such as IOTEK 8000, a 45% sodium neutralized ethylene-based ionomer of 15 wt % acrylic acid (prior to neutralization), and IOTEK 7030, a 25% zinc neutralized ethylene-based ionomer of 15 wt % acrylic acid, and SURLYN ionomers (DuPont Company, Wilmington, Del.).

The one or more ionomer layers may contain additives such as antioxidants, pigments or dyes, and other agents. In one embodiment, at least one layer of ionomer in the final composite article will have a pigment, antioxidant, or other additives. For external uses, it is desirable to add a UV stabilizer such as TINUVEN 791 (CIBA Specialty Chemicals) or UVASIL 2000 HM or LM (Great Lakes Chemicals), both silicon based compositions. Also, for scratch resistance, it is advantageous to add siloxane based compositions such as MB50-001 and/or MB50-321 (Dow Corning Corporation). Effective levels are known in the art and depend on the details of the base polymers, the fabrication mode and the requirements of the end application. In addition, hydrogenated and/or petroleum hydrocarbon resins and other plasticizers may be used as modifiers.

Other examples of additives include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts. In one embodiment, a metallic or metal flake pigment such as is used in the automotive industry may be used. The pigment may be included in a first, second, third ionomer layer, or any other layer. For example, the pigment may desirably be in a second layer only, the first layer having no pigment and providing gloss and scratch resistance to the laminate. This second layer may have metallic pigment or metal flake blend and be processed in a manner such that the final product has a shiny, metallic look, and changes appearance dependent upon the angle of view ("flop") useful in, for example, exterior automotive components, or a dull look useful in, for example, interior automotive components.

Tie-Layer

In one embodiment, the tie-layer is made from a (co)extrudable tie resin (CTR). In another embodiment, the tie-layer may comprise one or more layers of CTRs. In another embodiment, suitable CTRs include blends of CTRs (as described below) and/or blends of at least one CTR with conventional materials known in the art, i.e., acid polymers, soft ionomers, and thermoplastics, etc. (See WO 02/078953 and WO 02/078954).

In some of the structural formulas below, some of the bonds are shown attached to only one atom instead of two. This indicates that the moiety shown is a small segment of the whole polymer and that the free ends of those bonds are actually attached to other components of the polymer. For simplicity, only the structure of the moiety being discussed in the text is shown. One skilled in the art will understand this shorthand notation, the types of "other components" to which the subject moiety would be attached for the particular polymer composition and the fact that the subject moiety might be present in many places in the polymer.

Suitable CTRs include amine-containing polymers. Amine-containing polymers are copolymers of one or more $C_2$-$C_{10}$ α-olefins, preferably ethylene and/or propylene, and one or more ethylenically copolymerizable amine-containing monomer, the copolymer having amine groups that may be represented by the general formula:

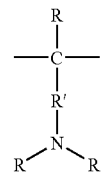

where each R is independently H or a $C_1$ to $C_{10}$ hydrocarbon and R' is a bond or a $C_1$ to $C_{10}$ hydrocarbon.

In a preferred embodiment, R is H and R' is a bond.

Other suitable CTRs include epoxy-containing copolymers and terpolymers. Epoxy-containing copolymers and terpolymers may be produced by direct copolymerization of $C_2$-$C_{10}$ α-olefins, preferably ethylene and/or propylene, and epoxy-containing monomers such as glycidyl acrylate or glycidyl methacrylate, and for terpolymers, with other ester monomers. Epoxy-containing monomers may be represented by the general formula:

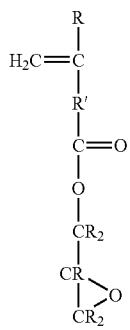

where each R is independently H or a $C_1$ to $C_{10}$ hydrocarbon and R' is independently a bond or a $C_1$ to $C_{10}$ hydrocarbon. The polymers of this invention may be made using mixtures of monomers with different R and R' groups.

Alternatively, epoxy-containing polymers may be made with an ester monomer to form an epoxy-containing terpolymer. The ester monomer may be represented by the general formula:

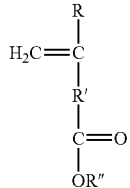

where each R is independently H or a $C_1$ to $C_{10}$ hydrocarbon; each R' is independently a bond or a $C_1$ to $C_{10}$ hydrocarbon; and R" is a $C_1$ to $C_{10}$ hydrocarbon. The polymers of this invention may be made using mixtures of monomers with different R, R' and R" groups.

Preferred embodiments of epoxy-containing polymers include the copolymers of ethylene and/or propylene with one or more ester monomers methyl(meth)acrylate, ethyl (meth)acrylate, propyl(meth)acrylate, or butyl (meth)acrylate.

Epoxy-containing polymers may also be produced by grafting epoxy-containing monomers onto $C_2$-$C_{10}$ α-olefins polymers, preferably ethylene and/or propylene polymers and/or copolymers of $C_2$-$C_{10}$ α-olefins with polar monomers such as vinyl esters and other ester monomers. These grafted, epoxy-containing polymers may be represented by the general formula:

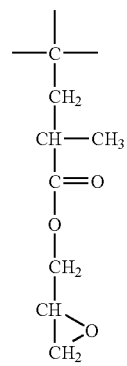

In some embodiments, each polymer molecule can be grafted with an epoxy-containing monomer, such as glycidyl methacrylate, in several places along the polymer chain.

Preferable embodiments include glycidyl methacrylate grafted onto polyethylene or a copolymer of ethylene with one or more ester monomers methyl(meth)acrylate, ethyl (meth)acrylate, propyl(meth)acrylate, or butyl (meth)acrylate.

Suitable CTRs also include acidic copolymers. Acidic copolymers include bipolymers of $C_2$-$C_{10}$ α-olefins, preferably ethylene and/or propylene, and acidic monomers that may be represented by the general formula:

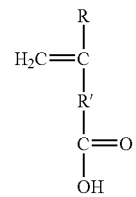

where R is H or a $C_1$ to $C_{10}$ hydrocarbon and R' is a bond or a $C_1$ to $C_{10}$ hydrocarbon.

In some embodiments, the polymers of this invention may be made using mixtures of acid monomers with different R and R' substituents. Preferred embodiments are ethylene and/or propylene copolymerized with acrylic acid and/or methacrylic acid.

Suitable CTRs may also be bipolymers of $C_2$-$C_{10}$ α-olefins, preferably ethylene and/or propylene, and ethylenically copolymerizable ester monomers represented by the general formula:

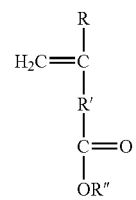

where R is H or a $C_1$ to $C_{10}$ hydrocarbon; R' is a bond or a $C_1$ to $C_{10}$ hydrocarbon; and R" is a $C_1$ to $C_{10}$ hydrocarbon.

The polymers of this invention may be made using mixtures of ester monomers with different R, R' and R" groups. Preferred embodiments are ethylene and/or propylene copolymerized with one or more of ester monomers methyl(meth) acrylate, ethyl(meth)acrylate, propyl(meth)acrylate, or butyl (meth)acrylate.

Suitable CTRs include copolymers of $C_2$-$C_{10}$ α-olefins, preferably ethylene and/or propylene, and vinyl ester monomers represented by the formula:

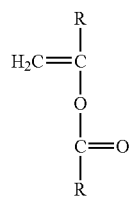

where each R is independently H or a $C_1$ to $C_{10}$ hydrocarbon.

Alternatively, vinyl ester copolymers may be made with other ester monomers to form terpolymers. The other ester monomer may be represented by the general formula:

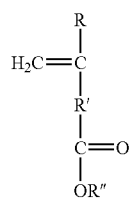

where R is H or a $C_1$ to $C_{10}$ hydrocarbon; R' is a bond or a $C_1$ to $C_{10}$ hydrocarbon; and R" is a $C_1$ to $C_{10}$ hydrocarbon.

The polymers of this invention may be made using mixtures of vinyl ester monomers and other ester monomers with different R, R' and R" groups. Preferred embodiments include ethylene or propylene copolymerized with vinyl acetate optionally with butyl(meth)acrylate.

Suitable CTRs also include grafted polymers of $C_2$-$C_{10}$ α-olefins, preferably ethylene and/or propylene, (such as LDPE, LLDPE, HDPE, PP, PP copolymers, EPR or EPDM), ethylene vinyl ester copolymers (based on from $C_1$ to $C_{10}$ acids), ethylene(meth)acrylate ester copolymers (made from $C_1$ to $C_{10}$ alcohols) grafted with (meth)acrylic acid represented by the general formula:

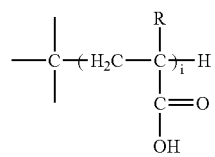

where each R is independently H or a $C_1$ to $C_{10}$ hydrocarbon and i is from 1 to 5. Each polymer molecule can be grafted with methacrylic acid in several places along the polymer chain.

Suitable CTRs also include polymers made with unsaturated diacids, anhydrides of unsaturated diacids, or monoesters of unsaturated diacids. Suitable unsaturated diacids include, but are not limited to, maleic acid, itaconic acid, citraconic acid and 2-pentenedioic acid and their corresponding anhydrides and monoesters. Illustrative examples may be represented by the general formulas:

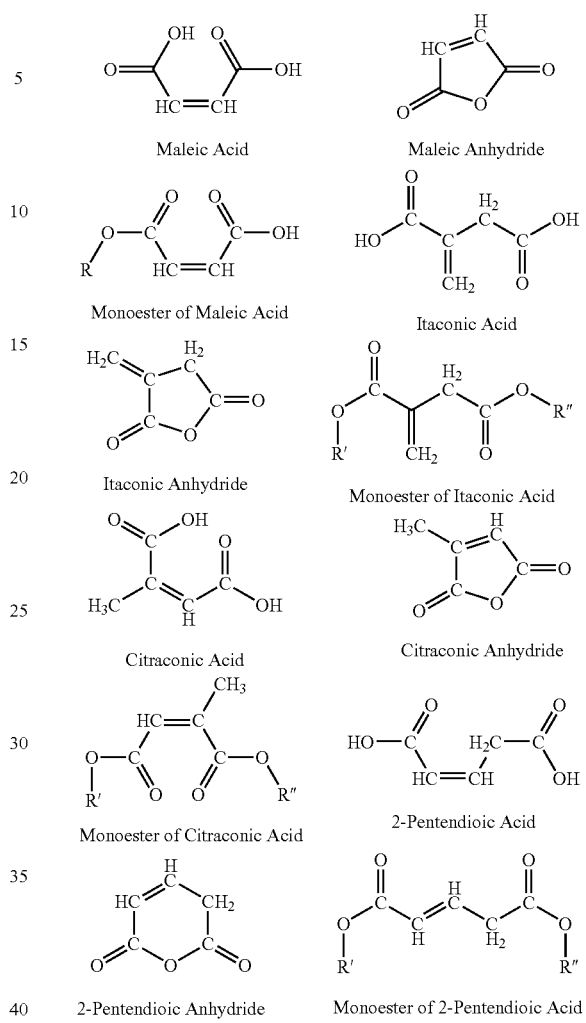

wherein for the monoester of maleic acid R is a $C_1$ to $C_{10}$ hydrocarbon and wherein for the monoesters of itaconic acid, citraconic acid and 2-pentenedioic acid, either R' is H and R" is a $C_1$ to $C_{10}$ hydrocarbon or R' is a $C_1$ to $C_{10}$ hydrocarbon and R" is H.

Other suitable CTRs include copolymers of one or more $C_2$ to $C_{10}$ α-olefins and carbon monoxide. These copolymers may be optionally copolymerized with one or more ethylenically copolymerizable acidic or ester monomers.

Ethylenically copolymerizable acidic monomers may be represented by the general formula:

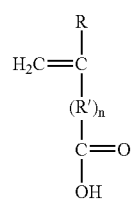

wherein R is H or a $C_1$ to $C_{10}$ hydrocarbon; R' is a $C_1$ to $C_{10}$ hydrocarbon; and n is 0 or 1. Preferred embodiments include acrylic acid and (meth)acrylic acid.

Ethylenically copolymerizable ester monomers of may be represented by the following general formula:

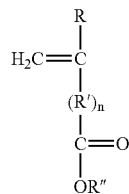

wherein R is H or a $C_1$ to $C_{10}$ hydrocarbon; R' is a $C_1$ to $C_{10}$ hydrocarbon; R" is a $C_1$ to $C_{10}$ hydrocarbon; and n is 0 or 1. Preferred embodiments include the group consisting of methyl(meth)acrylate, ethyl(meth)acrylate, propyl(meth)acrylate, and butyl(meth)acrylate.

Ethylenically copolymerizable vinyl ester monomers may be represented by the following general formula:

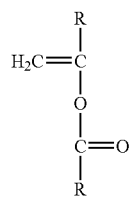

wherein each R is independently H or a $C_1$ to $C_{10}$ hydrocarbon. A preferred embodiment includes vinyl acetate.

In a preferred embodiment, the CTR is selected from the group consisting of an amine-containing polymer, an epoxy-containing polymer, a carbon monoxide containing polymer, a polar copolymer, a polymer made from an unsaturated diacid, a polymer made from a monoester of an unsaturated diacid, a polymer made from an anhydride of an unsaturated diacid, and a polyolefin grafted with acrylic acid.

In another preferred embodiment, the CTR is selected from the group consisting of an amine-containing polymer, an epoxy-containing polymer, a carbon monoxide containing polymer, an ester polymer, a vinyl ester polymer, a polymer made from an unsaturated diacid, a polymer made from a monoester of an unsaturated diacid, a polymer made from an anhydride of an unsaturated diacid, and a polyolefin grafted with acrylic acid.

CTRs useful in the invention have a melt index (MI ASTM D1238, 190/2.16) of from 0.1 to 60 dg/min in one embodiment, from 0.5 to 30 dg/min in another embodiment, from 1 to 20 dg/min in yet another embodiment, and from 2.0 to 10 dg/min in yet another embodiment, a desirable range including a combination of any upper MI limit and any lower MI limit disclosed herein.

In one embodiment, the backing layer is a blend of an appropriate CTR (selected independently from the CTR used in the tie-layer) and the material being used as the substrate material in the finished composite article. One skilled in the art will appreciate the need to select materials based upon processing parameters, i.e. selecting low melt flow rates for extruding backing layers and higher melt flow rates for substrates that are injection molded and other parameters important for creating a useful blend. General principles for making useful polymer-polymer blends can be found in the academic literature including books such as *Polymer Blends and Composite Articles,* John A. Manson and Leslie H. Sperling, Plenum Press, New York, 1976, Polymer Blends, edited by D. R. Paul and Seymour Newman, Academic Press, New York, 1978, *Specific Interactions and the Miscibility of Polymer Blends: Practical Guides for Predicting & Designing Miscible Polymer Mixtures,* Michael M. Coleman, John F. Graf, and Paul C. Painter, Technomic Publication Company, 1991, *Polymeric Compatibilizers. Uses and Benefits in Polymer Blends,* Sudhin Datta and David J. Lohse, Hanser/Gardner Publications, New York, 1996, *Polymer Blends,* edited by D. R. Paul and C. B. Bucknall, John Wiley & Sons, New York, 2000, and *Polymer Blends Handbook,* edited by L. A. Utracki, Kluwer Academic Press, Boston, 2003. The blend may include from 10 wt % to 90 wt % of a CTR in the backing layer in one embodiment, and from 20 wt % to 80 wt % in another embodiment, and from 25 wt % to 65 wt % in yet another embodiment, and from 30 wt % to 50 wt % in yet another embodiment, based upon the total weight of the blend. In another embodiment, the blend comprises at least 10 wt % of a CTR, alternatively at least 15 wt %, alternatively at least 20 wt %, and alternatively at least 25 wt %, based upon the total weight of the blend. Desirable embodiments of the backing layer include any combination of any upper CTR wt % limit and any lower CTR wt % limit described herein.

The substrate materials used to blend with the at least one tie-layer material has a 1% secant flexural modulus (ASTM D-790) of greater than 100 MPa in one embodiment, greater than 200 MPa in another embodiment, greater than 300 MPa in yet another embodiment, and greater than 500 MPa in yet another embodiment, and greater than 900 MPa in yet another embodiment, and less than 1000 MPa in yet another embodiment.

The tie-layer may have a thickness in the range of from 2.5 µm to 6 mm in one embodiment, and from 25 µm to 650 µm in another embodiment, from 2.5 µm to 400 µm in yet another embodiment, from 2 µm to 100 µm in yet another embodiment, and from 10 µm to 1 mm in yet another embodiment. Desirable ranges may include any combination of any upper tie-layer thickness limit and any lower tie-layer thickness limit described herein.

The tie-layer may also include additives as described above for the ionomer layers, such as pigments, dyes, antioxidants, antiozonants, and other agents to improve its performance. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts.

Substrate

A substrate material, as defined herein, is a material securable by any means known in the art, to the laminate. Desirably, the substrate is contacted with and secured to the tie-layer to form a composite article. Described another way, the substrate may be secured to the backing layer of the tie-layer in a multi-layer embodiment. The substrate material desirably has a 1% secant flexural modulus of greater than 100 MPa for substrate materials suitable for blending to form the backing layer.

In one embodiment of the invention, the substrate is any "thermoplastic" material such as defined in POLYMER TECHNOLOGY DICTIONARY 443 (Tony Whelan, ed., Chapman & Hall 1994) in any form, including foams. Such materials include so called polyolefins, engineering thermoplastics, thermoplastic rubbers, elastomers, plastics, and other thermoplastics known in the art, and more particularly include such materials as EPDM (ethylene-propylene-diene monomer) or EP (ethylene-propylene rubber), dynamically vulcanized alloys (Santoprene™ available from Advanced Elastomer Systems, Akron, Ohio), isobutylene-based rubbers (including copolymers of isobutylene and isoprene and copolymers of alkyl-styrene and isobutylene, as well as the halogenated versions of the copolymers), plastomers, acrylonitrile-butadiene-styrene terpolymer, acetal polymer, acrylic polymers, cellulosics, fluoroplastics, nylon and other polyamides, polyamide-imide, polycarbonate, polyester, polyetheretherketone, polyetherimide, polyethylene (homopolymers and copolymers including LLDPE, LDPE, HDPE, etc.), polyimide, polyphenylene oxide, polyphenylene sulfide, polypropylene (homopolymer, copolymers and impact copolymers (ICP)), polystyrene, polysulfone, polyurethane, polyvinyl chloride, and foams of such materials, as well as blends of these materials and other materials such as described in, for example, HANDBOOK OF PLASTICS, ELASTOMERS, AND COMPOSITE ARTICLES 3.18-3.25 (Charles A. Harper, ed., McGraw-Hill Inc. 1992). Suitable thermoplastics or blends of thermoplastics can be made by any suitable means known in the art, and can be made either by physical blending or in-situ reactor-made. (See references on polymer blends cited above). In other embodiments, the substrate is not nylon(s) and/or polyamide(s); therefore, the substrate does not contain more than 90% by weight of nylon(s) and/or polyamide(s). However, in these embodiments, the substrate may be an alloy, blend, or compound, containing nylon(s) or polyamide(s).

Desirably, in one embodiment, the substrate material has a melt flow rate (MFR) of greater than or equal to 10 dg/min (ASTM D1238, 230/2.16), and greater than 20 dg/min in another embodiment and be capable of being processed such as by injection molding, or other such processes described herein for securing such material to the laminate of the invention. For blow molding, the appropriate MI will be typically from 0.1 to 2, and in some cases less than 0.1., and other embodiments less than 1. In some embodiments, the substrate materials have a 1% secant flexural modulus (ASTM D-790) of 100 MPa or higher.

Suitable thermoplastics include thermoplastic polyolefins such as homopolymers, copolymers, or a combination thereof. These thermoplastic polyolefins may be blended with the acid polymers described above and/or with modifiers, described in greater detail below. More particularly, these thermoplastic polymers may be linear or branched polymers and include polyethylene polymers, polyethylene copolymers, polypropylene polymers and polypropylene copolymers having densities in the range from 0.85 to 0.96 g/cm$^3$. Suitable comonomer reactants may include one or a combination of $C_4$-$C_{30}$ α-olefins and ethylene for use with propylene. Other useful substrate materials are the class of dynamically vulcanized alloys of nylon and copolymers of isobutylene and p-methylstyrene.

One embodiment of a suitable substrate is a polypropylene or polyethylene material. The polypropylene may be homopolymers, propylene based copolymers, impact copolymers or block copolymers, or combinations thereof. The term "polypropylene", as used in this description and the appended claims, is defined to mean any propylene based polymer having a propylene-derived content of at least 60 wt % by weight of the "polypropylene" produced by methods well known in the art. In most applications it will be desirable that the polypropylene phase be continuous or nearly continuous. The polyethylene may be homopolyethylene, ethylene based copolymers, block copolymers, plastomers, and ethylene based rubbers as is common in the art. The term "polyethylene", as used in this description and the appended claims, is defined to mean any ethylene based polymer having an ethylene-derived content of at least 50 wt % by weight of the "polyethylene" produced by methods well known in the art.

Other additives may be included in the substrate formulations or any other ionomer layer or tie-layer disclosed herein, as suggested by the intended uses of the materials and the knowledge and experience of the formulator. In one embodiment, included in any layer is a primary antioxidant to deter oxidative degradation of the polymer, an acid scavenger to neutralized acid catalyst residues which may be present in the polymer to a greater or lesser extent, and nucleating agents as needed. Examples of the former class of additives would be hindered phenolic antioxidants and hindered amine light stabilizers, examples and the application of which are well documented in the art. Examples of the second category of additives would be metal salts of weak fatty acids such as sodium, calcium, or zinc stearate and weakly basic, naturally occurring minerals such as hydrotalcite or a synthetic equivalent like DHT-4A ($Mg_{4.5}Al_2(OH)_{13}CO_3 \cdot 3.5H_2O$, Kiowa Chemical Industry Co., Ltd.). The listings of possible additives are meant to be illustrative but not limiting of the choices which may be employed.

Many other types of additives could be optionally included in the layer formulations of this invention such as flame retardants, lubricants, antistatic agents, slip agents, antiblocking agents, colorants, metal deactivators, mold release agents, fillers and reinforcements, fluorescent whitening agents, biostabilizers, and others.

Laminate Formation

The tie-layer and at least one ionomer layer described above may be secured to one another by any appropriate means to form the laminate. In one embodiment, the ionomer layer is adhered to the tie-layer in a coextrusion process. The coextrusion process can include 2, 3, 4 or more coextruded layers. In general, the process includes first melting each material in an appropriate device and extruding these molten or semi-molten materials together through a die or dies. The various layers can be combined in the melt stage via appropriate mechanisms known in the art prior to exiting the die, or combined after exiting the die. This is followed by contacting the thus formed multi-layered laminate with a series of chill rolls and sheet conveyer. The cooled laminate is then cut to size or rolled by appropriate means. Alternatively, one skilled in the art will appreciate that the various materials can be extruded or calendered singly and combined into a multilayer structure in a separate process.

The ionomer, CTR and other materials that form the laminate of the present invention can be (co)extruded using conventional equipment well known in the industry. In one embodiment, the extrusion process conditions are as follows. The temperature controllers of the extruder(s) used to process the ionomer(s) are set at 180° C. to 225° C. in one embodiment, yielding a final material melt temperature of 200° C. to 215° C. or higher. Desirably, the ionomer material melt temperature is greater than 200° C. in another embodiment. The temperature controllers of the extruder(s) used to process the CTR(s) are set for 195° C. to 225° C. in another embodiment, yielding a final material melt temperature of 210° C. to 230° C. The viscosity of each material being extruded should be closely matched to each other, at their respective processing temperatures, to achieve the targeted gloss level and color compatibility.

In a preferred embodiment, extruders are used with a die that provides thermal isolation and/or control of each of the materials being processed to form the multilayer laminate. The temperature control can be achieved by any suitable means such as insulation and/or cooling and/or heating elements that can be controlled by electricity, steam, oil, or other gases or liquids. Such a coextrusion apparatus is described in, for example, U.S. Pat. Nos. 5,516,474 and 5,120,484, and references cited therein. The die may have separate flow channels within the die, and having a means by which to heat the material to a temperature higher than the melt temperature going into the die. For example, the die may be being controlled to a temperature from about 150° C. to 200° C., while one or more of the material streams that will make up the laminate may be further heated to from 230° C. to 270° C. Heating the layer having the pigment in this manner is particularly desirable. This procedure improves the "flop" of the laminate, in particular when metallic pigments are used such as, for example, in an exterior automotive part.

Further, the cooling of the laminate takes place on a chill roll or rolls, and may be cooled any number of ways. In one embodiment, the cooling takes place at a chill roll temperature of from 25° C. to 75° C. In yet another embodiment, the chill rolls are at from 4° C. to 20° C. In the latter embodiment, a dull finish is achieved when using a metallic pigment when the laminate is heated in the subsequent thermoforming process.

The final laminate may have any number of layers of ionomer and/or tie-layer materials. Embodiments of the laminate include one layer of ionomer and one layer of a CTR. Another embodiment includes two layers of ionomer and one layer of a CTR. In yet another embodiment of the laminate includes two layers of ionomer and two layers of tie-layer material such as a CTR and/or a blend of a CTR and polyolefin. In yet another embodiment of the laminate, there may be two layers of ionomer and one layer of a CTR/polyolefin blend as the tie-layer.

In one embodiment of the laminate of the invention, two layers of ionomer may be coextruded with one layer of tie-layer material, wherein the ionomers are $Zn^{2+}$ and $Na^+$ salts of ethylene acrylic acid copolymers and the tie-layer material is ethylene glycidyl methacrylate copolymer. Another embodiment includes two ionomer layers of zinc and sodium salts of ethylene acrylic acid copolymers and a tie-layer including a polypropylene/ethylene butyl acrylate copolymer (EBA) blend such as, for example, a polypropylene impact copolymer present from 10 to 90 wt % in one embodiment, and from 30 to 70 wt % in another embodiment, and from 40 to 60 wt % in yet another embodiment in the blend, and EBA present from 10 to 90 wt % in one embodiment, from 30 to 70 wt % in another embodiment, and from 40 to 60 wt % in yet another embodiment in the blend.

In yet another example of the laminate, two ionomer layers as described above may be present with one layer of tie-layer material, the tie-layer including a blend of high density polyethylene (HDPE) and EBA. The HDPE may be present in the range from 10 to 90 wt % in one embodiment, from 25 to 75 wt % in another embodiment, and from 35 to 65 wt % in yet another embodiment, while the EBA is present in the range from 10 to 90 wt % in one embodiment, from 25 to 75 wt % in another embodiment, and from 35 to 65 wt % in yet another embodiment.

In yet another example of the laminate, two ionomer layers may be present with one tie-layer material, wherein the tie-layer material is a blend of the following: HDPE and linear low density polyethylene (LLDPE) in a ratio of from 75/25 wt % to 85/15 wt %, blended with ethylene methyl acrylate (EMA), the EMA present in the tie-layer blend from 10 to 90 wt % in one embodiment, from 25 to 75 wt % in another embodiment, and from 35 to 65 wt % in yet another embodiment.

In yet another example of the laminate, two ionomer layers may be present with one tie-layer material, wherein the tie-layer material is a blend of the following: linear low density polyethylene blended with ethylene acrylic acid (EAA), the EAA present in the tie-layer blend from 10 to 90 wt % in one embodiment, from 25 to 75 wt % in another embodiment, and from 35 to 65 wt % in yet another embodiment.

In yet another example of the laminate, two layers of ionomer as described above may be coextruded with two layers of tie-layer material. Examples of this tie-layer configuration include one layer of an EMA and another layer of a blend of polypropylene and ethylene ethyl acrylate copolymer (EEA), specifically, a polypropylene impact copolymer present from 10 to 90 wt % in one embodiment, and from 30 to 70 wt % in another embodiment, and from 40 to 60 wt % in yet another embodiment in the blend, and EEA present from 10 to 90 wt % in one embodiment, from 30 to 70 wt % in another embodiment, and from 40 to 60 wt % in yet another embodiment in the blend.

The final laminate may have any number of layers of ionomer and tie-layer materials. In one embodiment, the laminate is two layers, three in another embodiment, and four layers in yet another embodiment. In one embodiment, the ionomer layer or layers, prior to thermoforming, are from 13 µm to 1 mm. In another embodiment, the pre-thermoformed ionomer layer (or layers) is from 25 µm to 380 µm. In yet another embodiment, the pre-thermoformed ionomer layer is from 200 µm to 380 µm. The tie-layer can be of comparable thickness ranges, making the overall thickness of the laminate from 100 µm to 5 mm in one embodiment, or from 250 µm to 3 mm in yet another embodiment.

In certain embodiments, the melt viscosity, or melt indexes (MI, ASTM D1238 test method, at 190° C. and 2.16 kg load) of each adjoining layer are within less than 5 dg/min of each other in one embodiment, within less than 4 dg/min of each other in another embodiment, and less than 3 dg/min from one another in yet another embodiment, and from within 1 to 4 dg/min of the layer in which it is in direct contact with during coextrusion in another embodiment, and within 2 to 3 dg/min of one another in another embodiment. However, one skilled in the art will recognize that the viscosity of each material to be extruded should be closely matched to each other, at their respective processing temperatures, to achieve the targeted gloss level and color compatibility.

Laminate Shaping Process

The laminate may be shaped into the profile of a desirable end use article by any suitable means known in the art. Thermoforming, vacuum forming, and blow molding are desirable embodiments of such a laminate shaping means.

Thermoforming is a process of forming at least one pliable plastic sheet into a desired shape. Methods of thermoforming are well known in the art. For example, see McDonald, Joseph N., *Thermoforming*, ENCYCLOPEDIA OF POLYMER SCIENCE AND ENGINEERING, VOL. 16, John Wiley & Sons, 807-832 (New York 1989). In an embodiment of the present invention, the laminate that is formed from the at least one ionomer layer and tie-layer are thermoformed into a desirable shape, typically the shape of the end use article. For illustration, an embodiment of the thermoforming sequence is described. First, a piece of the laminate, cut to the appropriate size, is placed on a shuttle rack to hold it during heating. The shuttle rack indexes into the oven which pre-heats the film before forming. Once the piece of the laminate is heated, the shuttle rack indexes back to the forming tool. The piece of the laminate is then vacuumed onto the forming tool to hold it in place and the forming tool is closed. The forming tool can be either "male" or "female" type tools. The tool stays closed to cool the shaped laminate and the tool is then opened. The shaped laminate is then removed from the tool.

Blow molding is another suitable laminate forming means, which includes injection blow molding, extrusion blow molding, and stretch blow molding. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990). One skilled in the art of blow molding these or similar materials will know the appropriate processing conditions to use. See, for example, WO 02/078953.

Composite Article Formation

Formation of the composite article may be achieved by any suitable means known to those skilled in the art. Illustrative examples include blow molding, transfer molding, wet lay-up or contact molding, cast molding, cold forming matched-die molding, injection molding, spray techniques, or combinations thereof. See, for example, WO 02/078953 and WO 02/078954.

In an embodiment, a (co)extruded tie-layer is secured to the pigmented ionomer layer. The material used to make the tie-layer here, and in some other embodiments of the tie-layer, may be adjusted based on the identity of the substrate material to be used to make the finished composite article. For example, if the substrate material is to be a polymer or polymer blend of polypropylene as the major component, it is desirable for the tie-layer, or at least the backing layer of the tie-layer, to be a blend of a CTR and a polypropylene-based material such as a polypropylene ICP. If the substrate material is to be a polymer or polymer blend of polyethylene as the major component, it is desirable that the tie-layer, or at least the backing layer of the tie-layer, be a blend of a CTR and a polyethylene-based material such as a plastomer or other polyethylene.

In one embodiment, these materials are coextruded in a multilayer die, then passed over at least two chill rolls and a sheet conveyor. This cooled sheet is then cut to size and/or wound onto a core. Sheets taken from this cooled material can then be placed on a thermoforming rack and thermoformed to conform substantially to the shape of an injection molding tool, followed by cooling of the shaped laminate, and trimming of the cooled shaped laminate to prepare it for use in forming the shaped composite article. This trimmed, shaped laminate is then placed into the injection molding tool exposing at least one layer of the tie-layer, in particular, the backing layer, in order to allow the tie-layer to be secured to the substrate material to be injected. Hence, the substrate material in molten form is then injected into the tool, forming a cohesive unit with the shaped laminate. The part that results is a shaped composite article having the desired shape and geometry of the end use article.

In an embodiment that uses the injection molding process to produce a finished article, the shaped laminate is placed into a tool and molten substrate material is injection molded behind the laminate against either the backing layer or a tie-layer. The melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt the tie-layer material or backing layer to achieve adhesion between the layers.

It will be understood by those skilled in the art that the steps outlined above may be varied, depending upon the desired result. For example, the coextruded sheet of layered ionomer and tie-layer may be directly thermoformed or blow molded without cooling, thus skipping a cooling step. Other parameters may be varied as well in order to achieve a finished composite article having desirable features.

The laminate may be formed by any suitable technique such as coextrusion, and may be shaped to form the shape of an article. The shaping can be performed by any suitable technique such as thermoforming. Finally, the substrate may be secured to the laminate by any suitable technique such as injection molding. The thus formed composite article may then be used to make any number of articles.

In another embodiment, the invention is a composite article including at least one layer of ionomer material, a tie-layer securable to a substrate material, and a substrate material secured to the tie-layer; the tie layer comprising at least one backing layer secured to the substrate; and wherein the backing layer comprises a blend of at least one CTR and at least one substrate material. The at least one ionomer layer may further include both a surface layer and a sub-surface layer that is secured to the tie-layer. The surface ionomer layer is desirably clear or non-pigmented and have a thickness of from 75 to 150 μm, alternatively at least 100 μm. The substrate material may have a 1% secant flexural modulus of greater than 100 MPa.

The composite article thickness is typically from 1 mm to 10 mm. For example, layer thicknesses may be as follows:

| | |
|---|---|
| Ionomer Surface Layer | clear: 130 μm-380 μm |
| Ionomer Sub-surface Layer | pigmented: 130 μm-640 μm |
| CTR-Based Tie-Layer | pigmented or natural color: 25 μm-250 μm |
| Backing Layer | pigmented or natural color: 250 μm-1 mm |
| Substrate | pigmented or natural color: 2 mm-6 mm |

INDUSTRIAL APPLICATIONS

The laminates and composite articles of the present invention can be used in various applications. They may be used in interior and exterior components of appliances such as clothing or dish washer exteriors, refrigerator door exteriors, refrigerator door interiors, refrigerator liners, refrigerator housings.

The laminates and composite articles of the present invention can also be applied in construction. Some examples include tubs and showers, liners for tubs and showers, counter tops, floor coatings, laminated surface counter tops, polymer/wood composites, prefabricated building materials, sidings, sinks and sink liners, synthetic marble panels, translucent glass replacements, vinyl tiles, wall covering, and wood replacements for decks.

Additionally, the laminates and composite articles of the present invention have utility in electronics for CDs and DVDs as well as for housing on TVs, VCRs, computers, and stereos.

The laminates and composite articles of the present invention may also be used in a variety of sporting equipment and parts. Illustrative examples include boats, hulls, boat hulls, marine boat hulls, canoe interiors and exteriors, boat covers, boat sails, jet skis (housings), skis, snowboards, snowmobiles, sports helmets, stadium seats, surfboards, and tent materials.

In other applications, the present invention is applied to exterior or interior automotive parts. Illustrative examples include vehicular parts, automotive parts, airbag doors, doors, automotive door panels (interior and exterior), body chassis, body panels, bumpers, deck lids, fenders, hoods, rocker panels, mirror housings, dashboards, instrument panels, fuel tanks, grills, hopper cars, interior trims, pillar trims, cup holders, personal containers, and wheel covers. Applications within this category also include other minor components of any 2, 3, 4 or more wheeled vehicles including farm tractors; lawn and garden tractors; lawn mowers; large trucks; bicycles; toy wagons; parts for All Terrain Vehicles (ATVs); parts for motorcycles such as fuel tanks; scooters; seat covers; and trims.

The inventive laminates and composite articles may be used in lawn, yard, and garden applications as well. Some examples are lawn/outdoor furniture, pool liners and covers, outdoor ornaments, and bird houses.

The inventive laminates and composite articles may also be used in aerospace reentry shields, cable jacketing, children's toys, clothing/fabric (combined with non-wovens), Gamma-radiation resistant applications, GORETEX™, luggage, and other applications for coating plastics and metals where a dull or glossy and a scratch resistant surface is desirable such as plastic microwaveable cookware, plastic paper goods, reflective signage and other reflective articles on roads and clothing, and wheels on in-line skates.

The aforementioned industrial applications may be combined with any of the embodiments described in the SUMMARY as well as any embodiments as claimed.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

Terms that are or may be trademarked in some jurisdictions are used in the description. These terms are written in all capital letters, and is understood to recognize such trademarks. For brevity, markings such as "™" or "®" have not been used.

All priority documents are herein fully incorporated by reference for all jurisdictions in which such incorporation is permitted. Further, all documents cited herein, including testing procedures, publications, patents, journal articles, etc., are herein fully incorporated by reference for all jurisdictions in which such incorporation is permitted.

What is claimed is:

1. A laminate comprising:
   an ionomer layer and
   a tie-layer comprising a (co)extrudable tie resin (CTR), wherein the CTR consists essentially of a copolymer of one or more $C_2$-$C_{10}$ α-olefins and one or more ethylenically copolymerizable amine-containing monomers, the copolymer having amine groups that may be represented by the general formula:

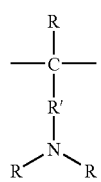

where each R is independently H or a $C_1$ to $C_{10}$ hydrocarbon and R' is a bond or a $C_1$ to $C_{10}$ hydrocarbon.

2. The laminate of claim 1, wherein R is H and R' is a bond.
3. The laminate of claim 1, wherein the $C_2$-$C_{10}$ α-olefins are ethylene and/or propylene.
4. The laminate of claim 1, wherein the ionomer layer comprises a first ionomer layer and a second ionomer layer.
5. The laminate of claim 4, wherein the first ionomer layer or the second ionomer layer is pigmented, natural, or clear.
6. The laminate of claim 1, further comprising a backing layer.
7. A composite comprising:
   an ionomer layer;
   a tie-layer comprising a (co)extrudable tie resin (CTR); and
   a substrate, wherein the CTR consists essentially of a copolymer of one or more $C_2$-$C_{10}$ α-olefins and one or more ethylenically copolymerizable amine-containing monomers, the copolymer having amine groups that may be represented by the general formula:

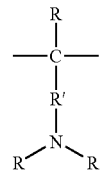

where each R is independently H or a $C_1$ to $C_{10}$ hydrocarbon and R' is a bond or a $C_1$ to $C_{10}$ hydrocarbon.

8. The composite of claim 7, wherein R is H and R' is a bond.
9. The composite of claim 7, wherein the $C_2$-$C_{10}$ α-olefins are ethylene and/or propylene.
10. The composite of claim 7, wherein the ionomer layer comprises a first ionomer layer and a second ionomer layer.
11. The composite of claim 10, wherein the first ionomer layer or the second ionomer layer is pigmented, natural, or clear.
12. The composite of claim 7, wherein the ionomer layer comprises a zinc-neutralized ionomer or a sodium-neutralized ionomer.
13. The composite of claim 7, further comprising a backing layer.
14. The composite of claim 7, wherein the thickness of the composite article is from 200 µm to 6 mm.
15. The composite of claim 7, wherein the substrate material is selected from EPDM (ethylene-propylene-diene monomer), EP (ethylene-propylene rubber), acrylonitrile-butadiene-styrene terpolymer, acetal polymer, acrylic polymers, cellulosics, fluoroplastics, nylon and other polyamides, polyamide-imide, polycarbonate, polyester, polyetheretherketone, polyetherimide, polyethylene, polyimide, polyphenylene, polyphenylene sulfide, plastomer, polypropylene, polypropylene impact copolymers, polystyrene, polysulfone, polyurethane, polyvinyl chloride, and foams of such materials, as well as blends of these materials.
16. The composite of claim 7, wherein the substrate is a polyolefin selected from polyethylene polymers, polyethylene copolymers, polypropylene polymers, polypropylene copolymers, polypropylene impact copolymer and a blend of polypropylene impact copolymer and ethylene plastomer, and mixtures thereof.

17. The composite article of claim 7, wherein the laminate is thermoformed.

18. A composite article formed by the method comprising:
(a) providing a laminate comprising an ionomer layer and a tie-layer comprising a (co)extrudable tie resin (CTR);
(b) forming a shape from the laminate, resulting in a shaped laminate; and
(c) securing a substrate material to the shaped laminate, wherein the CTR consists essentially of a copolymer of one or more $C_2$-$C_{10}$ α-olefins and one or more ethylenically copolymerizable amine-containing monomers, the copolymer having amine groups that may be represented by the general formula:

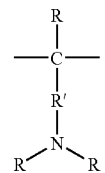

where each R is independently H or a $C_1$ to $C_{10}$ hydrocarbon and R' is a bond or a $C_1$ to $C_{10}$ hydrocarbon.

19. The composite article of claim 18, wherein R is H and R' is a bond.

20. The composite article of claim 18, wherein the $C_2$-$C_{10}$ α-olefins are ethylene and/or propylene.

* * * * *